(12) United States Patent
Polavarapu et al.

(10) Patent No.: US 11,087,137 B2
(45) Date of Patent: Aug. 10, 2021

(54) METHODS AND SYSTEMS FOR IDENTIFICATION AND AUGMENTATION OF VIDEO CONTENT

(71) Applicant: Verizon Patent and Licensing Inc., Arlington, VA (US)

(72) Inventors: Vinay Polavarapu, Irving, TX (US); Christian Egeler, Roseland, NJ (US); Sergey Virodov, Fair Lawn, NJ (US); William Patrick Dildine, Hoboken, NJ (US); Adwait Ashish Murudkar, Highland Park, NJ (US); Paul Duree, Livermore, CA (US); Gang Lin, Colorado Springs, CO (US); Paul Cannon, Frederick, MD (US); Alexander Zilbershtein, Buffalo Grove, IL (US); Pai Moodlagiri, Clinton, NJ (US)

(73) Assignee: Verizon Patent and Licensing Inc., Basking Ridge, NJ (US)

(\*) Notice: Subject to any disclaimer, the term of this patent is extended or adjusted under 35 U.S.C. 154(b) by 83 days.

(21) Appl. No.: 16/278,377

(22) Filed: Feb. 18, 2019

(65) Prior Publication Data
US 2020/0265238 A1    Aug. 20, 2020

(51) Int. Cl.
*G06K 9/00* (2006.01)
*G06N 20/00* (2019.01)
*G06K 9/62* (2006.01)
*G06K 9/32* (2006.01)

(52) U.S. Cl.
CPC ..... *G06K 9/00744* (2013.01); *G06K 9/00671* (2013.01); *G06K 9/00718* (2013.01); *G06K 9/3233* (2013.01); *G06K 9/6256* (2013.01); *G06N 20/00* (2019.01)

(58) Field of Classification Search
CPC .......... G06K 9/00744; G06K 9/00718; G06K 9/3233; G06K 9/6256; G06K 9/00671; G06N 20/00; G06N 3/0454; G06N 3/08
See application file for complete search history.

(56) References Cited

U.S. PATENT DOCUMENTS 10,679,428 B1 *  6/2020  Chen ................... G06K 9/627
2020/0074739 A1 *  3/2020  Stauber ................ G06T 19/006

OTHER PUBLICATIONS

Cziva et al. "On the Latency Benefits of Edge NFV." ACM/IEEE Symposium on Architectures for Networking and Communications Systems (ANCS), May 18, 2017, pp. 105-106 (Year: 2017).*

\* cited by examiner

*Primary Examiner* — Jon Chang

(57) ABSTRACT

An exemplary object identification system detects, based on a machine learning model, an object depicted within a video frame. The system identifies, based on the detecting of the object, a class label of the object and a region of interest, within the video frame, of the object. The system identifies, within the region of interest of the object, set of features of the object. The system compares the set of features of the object with a plurality of predefined features within a data store associated with the class label of the object. The system determines, based on the comparing of the set of features of the object with the plurality of predefined features within the data store, whether the object is configured to trigger an augmentation of video content associated with the video frame. Corresponding methods and systems are also disclosed.

20 Claims, 9 Drawing Sheets

METHODS AND SYSTEMS FOR IDENTIFICATION AND AUGMENTATION OF VIDEO CONTENT

BACKGROUND INFORMATION

Augmented reality systems may render a video frame with an augmentation overlay within the video frame. The rendered video frame, including the augmentation overlay, may be provided to a device for display to provide an individual with an augmented reality experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
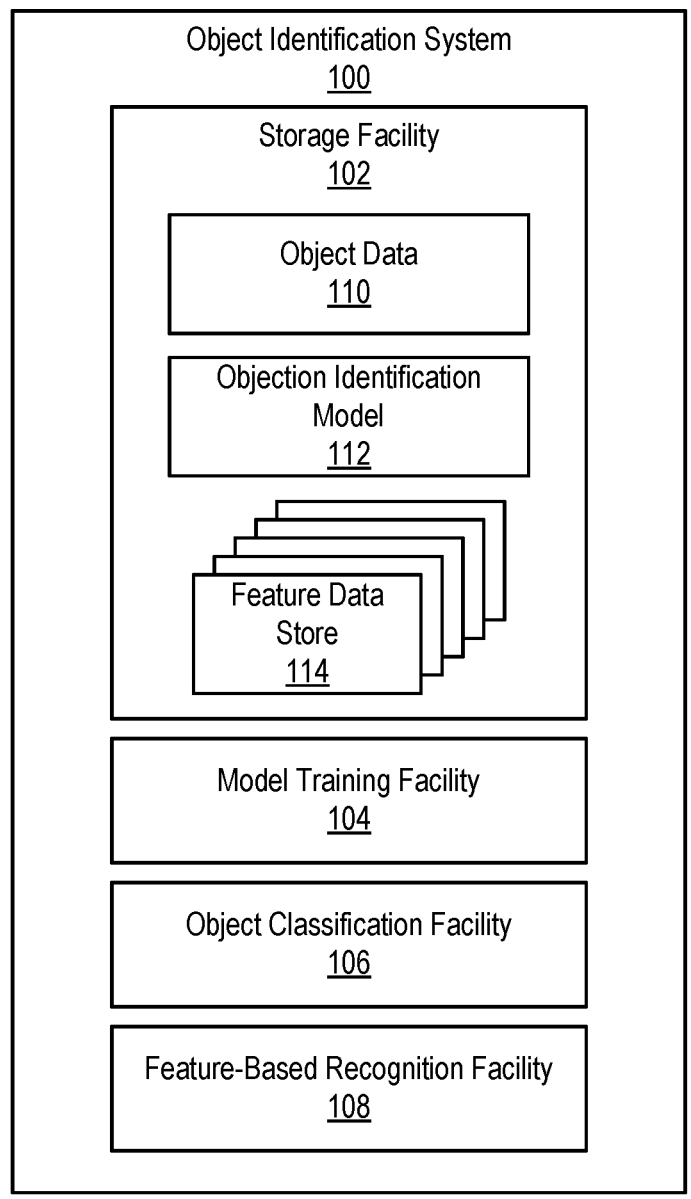
FIG. 1 illustrates an object identification system according to principles described herein.

Methods and systems for identification and augmentation of video content are described herein. In an example, an object identification system may detect an object depicted within a video frame. Based on the detection of the object, the object identification system may identify a class label of the object and a region of interest, within the video frame, of the object. The object identification system may identify, within the region of interest of the object, a set of features of the object. The object identification system may compare the set of features of the object with a plurality of predefined features within a data store that is associated with the class label of the object. Based on the comparison, the object identification system may determine whether the object is configured to trigger an augmentation of video content associated with the video frame. When the object is determined to trigger an augmentation of video content associated with the video frame, systems and methods described herein may augment the video content in any of the ways described herein.

In certain implementations, systems and methods described herein may be implemented at a network edge server having a low-latency network connection with a device that captured the video frame. Such implementations may facilitate low-latency network-based object identification and video content augmentation. In certain examples, this may facilitate concurrent low-latency network-based augmentations of video content based on multiple objects being detected within a video frame and determined to trigger the augmentations of the video content, such as by performing identification of objects detected in a video frame in parallel to determine, in parallel, that the objects are configured to trigger the augmentations of the video content.

Methods and systems described herein for identification and augmentation of video content may provide various benefits, which may include one or more advantages over object identification technologies used in conventional computer-implemented augmented reality systems. For example, an object identification system, such as any of the exemplary object identification systems described herein, may implement hierarchical, multi-stage subsystems that perform a multi-step identification of an object depicted in a video frame. A first object classification subsystem may detect objects, within a video frame, that are associated with any of plurality of defined object classes, and may identify a region of interest, within the video frame, of each of the detected objects. A second object classification subsystem may implement any number of target classifiers configured to perform class-specific target recognition of features, found within the identified region of interest, of each of the detected objects, and to determine, based on target-specific feature identification, whether one or more of the detected objects are configured to trigger an augmentation of the video frame. The subsystems of the hierarchical system may operate synergistically to provide an overall efficiency and/or robustness to the object identification system such that the object identification system may support identification of a high capacity of various target objects.

In certain implementations, the object identification system may be device independent, such that the object identification system may be implemented within and/or used by any appropriately configured type of device. For example, the object identification system may be implemented by any suitable network device configured to establish a network connection (e.g., a low-latency network connection) with any suitable user computing device that captures video and displays augmented video when object identification system determines that one or more objects depicted in the captured video are configured to trigger augmentation of video.

In certain implementations, the object identification system may be implemented within a network server, such as a network edge server, which may enable flexibility in design of the object identification system. Implementing the object identification system within a network edge server may provide low-latency communication between a device implementing the object identification system and a device capturing a video frame for identification and presents a rendered video frame that selectively includes augmentation content as described herein. Additionally, implementing the object identification system within a network edge server may allow the object identification system to determine, in parallel, whether multiple detected objects within a video frame are configured to trigger multiple, concurrent augmentations of video content associated with the video frame as described herein.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary object identification system 100 ("system 100"). As shown, system 100 may include, without limitation, a storage facility 102, a model training facility 104, an object classification facility 106, and a feature-based recognition facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, facilities 102 through 108 may be distributed between multiple devices and/or multiple locations as may serve a particular implementation. Additionally, one or more of facilities 102 through 108 may be omitted from system 100 in certain implementations, while additional facilities may be included within system 100 in the same or other implementations.

Each of facilities 102 through 108 may include or be implemented by computing hardware and/or software components (e.g., processors, memories, communication interfaces, instructions stored in memory for execution by the processors, etc.). The facilities may be implemented using separate computing components unique to each facility, or may be implemented using shared computing components.

The facilities of the system 100 may perform one or more of the operations described herein to identify and augment video content. For example, system 100 may access a video frame, detect an object depicted within the video frame, identify a class label of the object and a region of interest, within the video frame, of the object, identify, within the region of interest of the object, a set of features of the object, compare the set of features of the object with a plurality of predefined features within a data store that is associated with the class label of the object, and determine, based on the comparison, whether the object is configured to trigger an augmentation of a video frame.

In certain examples, system 100 may implement a first object classification stage in which a trained machine learning model is used to detect an object within a video frame, and to identify a class label of the object and a region of interest, within the video frame, of the object. For example, system 100 may input data representative of a video frame, such as data representative of video content and/or features of the video content within the video frame, into the machine learning model, which may process the input data to generate and provide output data that is representative of a detection of an object within the video frame. The output data may be used by system 100 to identify a class label (e.g., an index of an object class) of a detected object. System 100 may also use the output data to identify a region of the video frame within which the detected object is located as a region of interest of the detected object.

System 100 may also implement a second object classification stage in which system 100 uses the identified class label and region of interest of the object to determine whether the detected object is configured to trigger an augmentation of a video frame. For example, system 100 may identify a set of features found within the region of interest of the video frame and compare the identified features with predefined features represented by data stored within a data store associated with the class label of the object. Based on the comparison, system 100 may determine whether the object is configured to trigger an augmentation of a video frame.

Each of the facilities of system 100 and exemplary operations that may be performed by the facilities of system 100 to identify and augment video content will now be described in more detail.

Storage facility 102 may store and maintain any data received, generated, managed, used, and/or transmitted by facilities 104 through 108 as may serve a particular implementation. In some examples, for instance, storage facility 102 may include data representative of object data 110, an object identification model 112, and one or more feature data stores 114.

Object data 110 may include any type of data representative of and/or associated with an object depicted within a video frame. For instance, object data 110 may include data representative of, but not limited to, features identified of an object, a class label of an object, and a region of interest, within the video frame, of the object. Additional examples of data for an object are described herein.

Object identification model 112 may include any type or implementation of a machine learning model for detecting an object depicted within a video frame. Object identification model 112 may detect an object depicted within a video frame in any suitable way. For example, object identification model 112 may identify, within the video frame, data representative of features indicative of an object within the video frame. In certain examples, object identification model 112 may identify a class label of the object and a region of interest within the video frame of the object. In certain examples, object identification model 112 may determine a confidence metric that the object is associated with the identified class label. Examples of such operations are described herein.

In certain implementations, object identification model 112 may include a neural network having an input layer, any suitable number of hidden layers, and an output layer. The neural network may be a convolutional neural network, a residual convolutional neural network, or any other suitable neural network. In other implementations, object identification model 112 may include any other suitable machine learning model, such as a deep learning machine learning model, configured or configurable to identify an object depicted within a video frame.

Feature data stores 114 may each store one or more distinct predefined features associated with one or more targets configured to trigger an augmentation of a video frame. In an example, a target may be any object having distinct features, and that is configured to trigger an augmentation of a video frame. Each feature data store 114 may store any suitable data to distinguish between targets configured to trigger an augmentation of a video frame. For example, a feature data store 114 may include different groups of features, and each group may include distinct correspondence features that trigger an augmentation when the distinct features are identified in a video frame. In an example, correspondence features may be a set of features stored within a feature data store 114 that match a set of features detected within a region of interest of an object depicted within a video frame as will be described herein. In certain implementations, each feature data store 114 may be associated with a respective class label of an object, and a determined class label of a detected object may be used to identify an appropriate one of the feature data stores 114 to use for feature-based recognition operations. Examples of ways that feature data stores 114 may be used by system 100 to determine whether an object is configured to trigger an augmentation of a video frame are described herein.

Model training facility 104 may be configured to train a machine learning model, such as object identification model 112, to perform one or more of the object detection operations described herein. For example, model training facility 104 may train an object identification model to detect an object depicted within a video frame, identify a class label of the object, determine a confidence metric that the object is associated with the identified class label, and identify a region of interest of the object. For example, model training facility 104 may execute one or more training sessions, of a training phase, to train an object identification model capable of machine learning. A training session may be performed in any suitable way. For example, model training facility 104 may submit one or more sets of labeled training data representing test objects to the object identification model, such that the object identification model learns to detect an object depicted within a video frame, identify a class label of the object, determine a confidence metric that the object is associated with the identified class label, and identify a region of interest of the object. In certain examples, model training facility 104 may submit as training data, to the object identification model, an image of a test object, data representing a set of features of the test object, and identification of a correct or preferred class label of the test object. The object identification model may use the set of features of the test object and the identification of the correct or preferred class label to learn how to detect an object depicted within a video frame and to identify a correct or preferred class label of the detected object.

Model training facility 104 may be configured to train an object identification model capable of machine learning in any suitable way. For example, model training facility 104 may train the object identification model starting from scratch using a test object (e.g., a test image of the test object), labeled features of the test object, and an identified correct or preferred class label of the object, and/or may further train the object identification model using additional training data for test objects. In certain examples, model training facility 104 may be located in any suitable device other than system 100. In such examples, the trained object identification model may be pulled into system 100 on-demand (e.g., as needed to identify objects depicted within a video frame). For example, model training facility 104 may be implemented by a device such as a model training server (e.g., a cloud-based server) and may perform operations to train an object identification model, which may be provided to one or more network edge devices that implement other facilities of object identification system 100 such as object classification facility 106 that is configured to use the trained object identification model to detect an object depicted within the video frame in any of the ways described herein. An example of model training facility 104 training an object identification model is described in more detail herein.

Object classification facility 106 may be configured to access a video frame captured by a device, and to execute a runtime operation of a trained object identification model, such as object identification model 112, to detect one or more objects depicted within the video frame. For example, object classification facility 106 may submit the video frame to the object identification model 112, which may search for a set of features within the video frame. Based on the set of features found within the video frame, object classification facility 106 may detect one or more objects associated with the set of features found within the video frame.

Object classification facility 106 may be configured to identify a class label of a detected object. Object classification facility 106 may identify a class label of a detected object in any suitable way and using any suitable data of the object, such as a set of features found in the video frame and associated with the detected object. For example, object classification facility 106 may identify that the set of features are associated with a particular object class. Based on the identification of the object class, object classification facility 106 may assign a class label of that object class to the object.

In certain examples, object classification facility 106 may determine multiple possible class labels of an object. In such examples, object classification facility 106 may determine distinct confidence metrics (e.g., probabilities) that the object belongs to each of the possible class labels. Based on the distinct confidence metrics, object classification facility 106 may identify the class label with the highest confidence metric that is above a predetermined threshold value as the class label of the object.

Object classification facility 106 may be configured to identify a region of interest, within the video frame, of a detected object. In an example, object classification facility 106 may identify a region of interest of a particular object by identifying a region, within the video frame, where a set of features of that particular object are located. Object classification facility 106 may identify or define a region of interest of the object such that all of the features of that particular object are within the region of interest. In certain examples, object classification facility 106 may be configured to define a region, such as a bounding box, within the video frame, that encompasses the detected features of the object.

Upon distinct class labels and distinct regions of interest being identified for each detected object within a video frame, object classification facility 106 may mask all identified regions of interest of the one or more detected objects. Based on the mask, object classification facility 106 may determine a remaining portion of the video frame wherein additional objects that may not be associated with known object classes (e.g., object classes associated with class labels) may be depicted. In an example, the remaining portion of the video frame may be analyzed to determine whether an object is depicted within the remaining portion, as will be described herein.

Feature-based recognition facility 108 may be configured to perform one or more operations to determine whether an object that is detected within a video frame by object classification facility 106 is configured to trigger an augmentation of a video frame. For example, feature-based recognition facility 108 may select a target classifier from a plurality of target classifiers based on a class label of the detected object. In an example, the selected target classifier may include or be associated with a data store associated with an object class corresponding to the class label.

Feature-based recognition facility 108 may identify, within an identified region of interest of a detected object, a set of features found within the region of interest of the detected object. Feature-based recognition facility 108 may compare the set of features found within the region of interest to predefined features in the data store of the selected target classifier. Based on the comparison, feature-based recognition facility 108 may determine whether the detected object is configured to trigger an augmentation of a video frame.

In certain examples, feature-based recognition facility 108 may identify, within a remaining portion of the video frame (e.g., a portion remaining after a mask is applied to identified regions of interest of detected objects), set of features found within the remaining portion of the video frame. Feature-based recognition facility 108 may compare the set of features found within the remaining portion of the video frame to predefined features in a miscellaneous data store that is not associated with any particular class label. Based on the comparison, feature-based recognition facility 108 may determine whether one or more objects associated with the identified features are configured to trigger an augmentation of a video frame.

Figure 2:
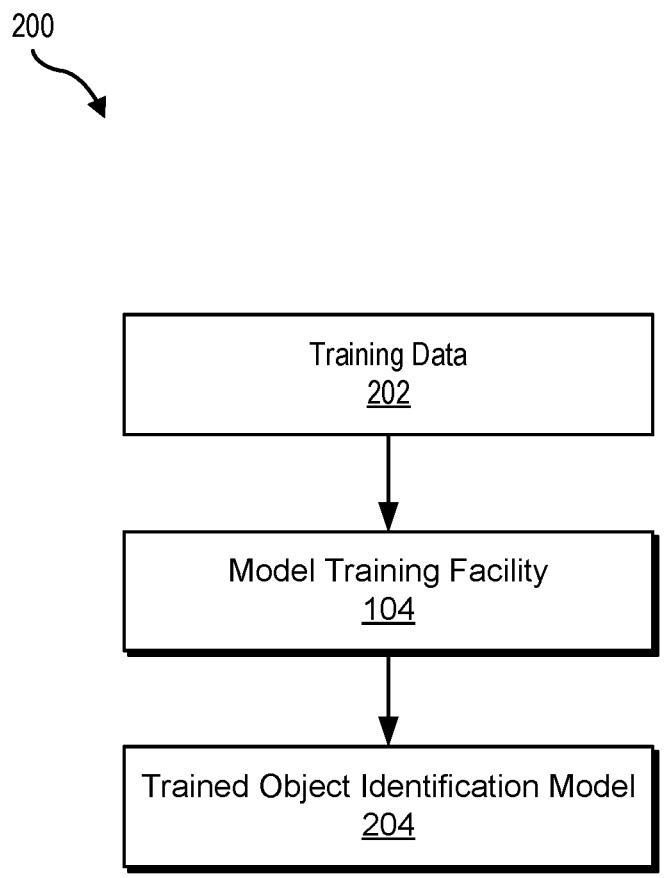
FIG. 2 illustrates an exemplary configuration for training an object identification model according to principles described herein.

FIG. 2 illustrates an exemplary configuration 200 for training an object identification model. Training data 202 may be provided to a model training facility within any suitable device. For example, training data 202 may be provided to model training facility 104, which may utilize the training data 202 to train an object identification model, such as object identification model 112 of FIG. 1, in any suitable manner. For example, model training facility 104 may use training data 202 to train an object identification model to detect an object depicted within a video frame, identify a class label of the object, determine a confidence metric that the object is associated with the identified class label, and identify a region of interest of the object.

Training data 202 may include any suitable data representative of a test object. For example, the training data 202 may include an image of a test object, and data representing a set of features of the test object. Training data 202 may also include an identification of a correct or preferred class label (e.g., a class label to identify an object class) of the test object.

In certain examples, prior to training data 202 being provided to model training facility 104, training data 202 may be labeled in any suitable way. For example, training data may be labeled to identify a set of features and a region of interest of a test object and/or to identify the object and features in one or more source images. In certain examples, the one or more source images may be warped (based on expected rotation angles) images of an object within a video frame and the warped images may be overlaid on a variety of background images to create the labeled training data. In an example, the labeling of the training data may be an automated process, such that an individual does not have to manually label the features and region of interest of the test object.

During a training phase, model training facility 104 may execute one or more sessions to facilitate training of an object identification model based on training data 202. In some examples, model training facility 104 may access and use both the data representing set of features of the test object and the identification of a correct or preferred class label of the test object to train the object identification model to detect an object and identify a class label of the detected object in any suitable way. For example, during the training phase, model training facility 102 may use any suitable machine learning technologies to perform operations to facilitate learning, by an object identification model, of how to identify a class label of a test object based on set of features of the test object within the training data 206, such that a correct or preferred class label is identified or provided with a highest confidence metric of the test object.

In certain examples, model training facility 104 may train the object identification model to identify a region of interest, within the test image, of the test object in any suitable way. For example, model training facility 104 may access the image for the test object and train the object identification model to identify the set of features of the test object within the image and to identify a region within the image that includes all of the set of features of the test object as a region of interest of the test object.

Completion of a training phase, by model training facility 104, may result in a trained object identification model 204 that is configured to detect an object within a video frame, identify a set of features of the object, identify a region of interest, within the video frame, of the object, and identify a class label of the object. In one example, the trained object identification model 204 may be stored in a data store, such as storage facility 102, and may be executed during runtime by any suitable computing component, including object classification facility 106, to detect an object within a video frame, identify a set of features of the object, identify a region of interest, within the video frame, of the object, and identify a class label of the object.

In certain examples, after completion of an initial training phase, which results in trained object identification model 204, an additional training phase with one or more training sessions may be performed so that a new object may be added to trained object identification model 204. The additional training phase may be initiated in any suitable way, such as in response to a user uploading a new object for identification to system 100. In an example, model training facility 104 may detect set of features of the new object and determine a correct or preferred class label of the new object. Multiple training sessions may be performed by model training facility 102 to facilitate training of the object identification model to detect the new object within a video frame, identify set of features of the object, identify a region of interest, within the video frame, of the object, and identify a class label of the new object as described above. Completion of this additional training phase, by model training facility 102, may result in trained object identification model 204 being configured to identify a class label of the new object and a region of interest, within a video frame, of the new object as output from the trained object identification model 204.

Additionally or alternatively, a model training facility may be located in any suitable device other than system 100, such that system 100 does not train an object identification model nor train the object identification model for detection of new objects. In certain examples, trained object identification model 204 and features of new objects may be stored in a storage facility of a device separate from system 100 and may be pulled into system 100 as needed. In these examples, the training and storage of trained object identification model 204 along with the storage of features of new objects may conserve resources utilized within system 100.

Figure 3:
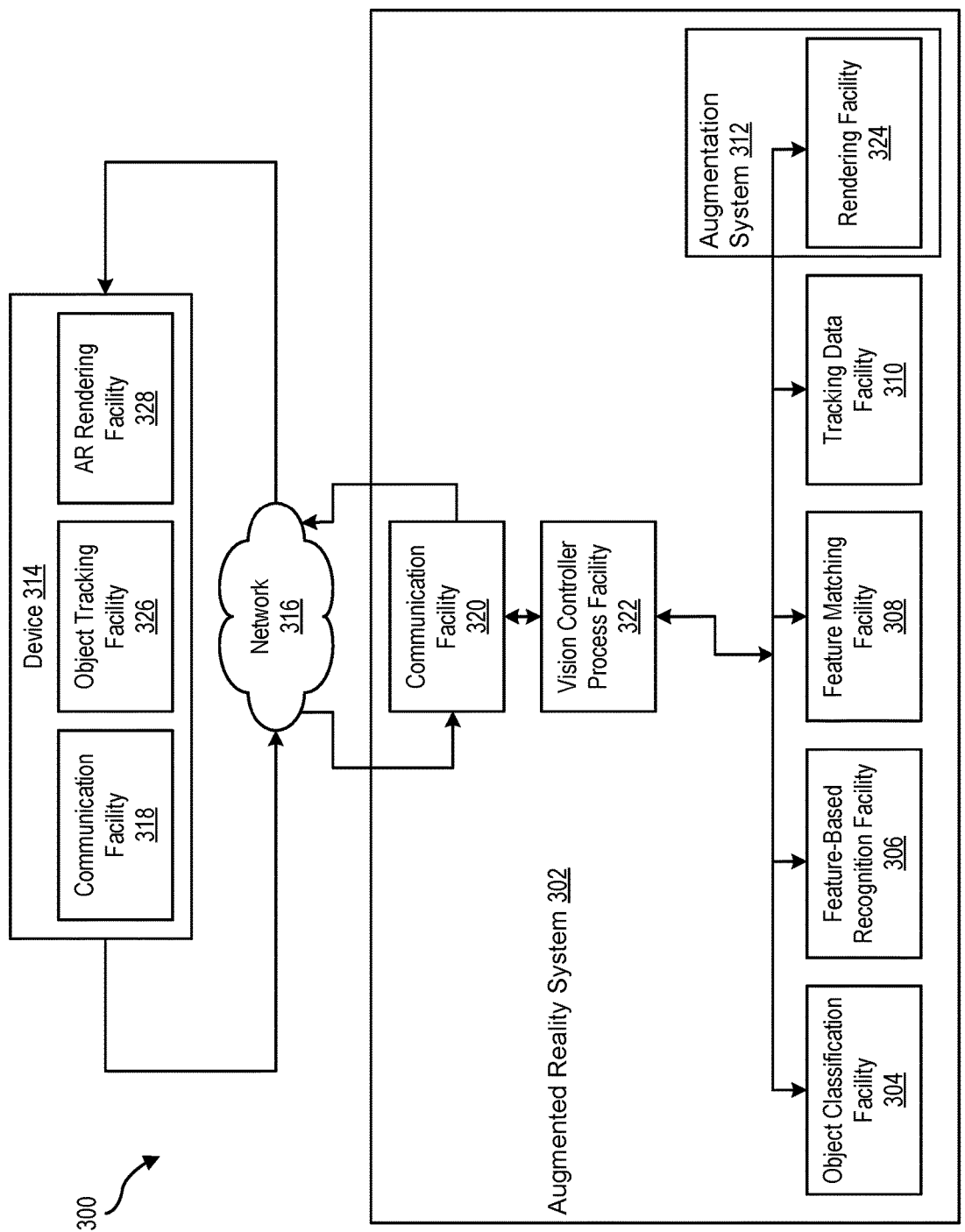
FIG. 3 illustrates an exemplary configuration for identification and augmentation of video content according to principles described herein.

FIG. 3 illustrates an exemplary configuration 300 in which an augmented reality system 302 may operate to identify and augment video content. For example, as shown, augmented reality system 302 includes an object classification facility 304, a feature-based recognition facility 306, a feature matching facility 308, and a tracking data facility 310. Object classification facility 304 may access a video frame, detect an object depicted within the video frame, identify a class label of the object and a region of interest, within the video frame, of the object. Feature-based recognition facility 306 may identify, within the region of interest of the object, a set of features of the object, compare the set of features of the object with a plurality of predefined features within a data store that is associated with the class label of the object, and determine, based on the comparison, whether the object is configured to trigger an augmentation of a video frame. Augmented reality system 302 also includes an augmentation system 312 configured to augment a video frame with augmentation content (e.g., by rendering a video frame with augmentation content included within the video frame) in response to a determination that an object is configured to trigger an augmentation of video content.

Augmented reality system 302 may provide an augmented video frame to a computing device configured to display the augmented video frame to a user of the computing device. For example, as shown in FIG. 3, augmented reality system 302 may be communicatively coupled with a computing device 314 ("device 314") by way of a network 316. Augmented reality system 302 and device 314 may communicate one with another by way of network 316 using any suitable data communications technologies.

Network 316 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Accordingly, data may flow between augmented reality system 302 and device 314 by way of network 316 using any communication technologies, devices, media, and protocols as may serve a particular implementation. For example, data may flow between augmented reality system 302 and device 314 by way of a video chat capability connection established between a communication facility 318 of device 314 and a communication facility 320 of augmented reality system 302. Communication facilities 318 and 320 may implement any data communication technologies suitable to support the operations described herein, such as any suitable video data communication technologies.

Augmented reality system 302 may be implemented as any suitable computing device or devices configured to perform one or more operations to determine whether an object within a video frame is configured to trigger an augmentation of the video frame and to selectively augment video content based on the determination. For example, augmented reality system 302 may be implemented as any suitable cloud-based server(s) at any location within or communicatively coupled to network 316. In particular, augmented reality system 302 may be implemented as an edge server located at an edge of network 316, such that augmented reality system 302 provides an entry point to network 316. In an example, augmented reality system 302 implemented as an edge server within network 316 may provide low-latency data communications between device 314 and augmented reality system 302 as compared to augmented reality system 302 being implemented as a server located at a different location within network 316.

In certain examples, augmented reality system 302 may be implemented as a network edge server having an ultra-low latency network communication connection with device 314. As used herein, an ultra-low latency communication connection may refer to a network connection or other communicative coupling between computing devices that allows data to travel between the devices in less time than users of the devices are readily capable of perceiving. For example, ultra-low latency communication connections may provide round trip processing and transmission delays of a few milliseconds (e.g., less than about 10-50 milliseconds in certain examples). Such ultra-low latency communication connections may be established by way of mobile edge computing ("MEC") technologies employed on 5G cellular data networks, or by way of other suitable technologies. By implementing augmented reality system 302 with high capacity computing resources at a network edge server having a ultra-low latency network connection with device 314, augmented reality system 302 may provide off-device network-based identification and augmentation of video content in a manner that supports concurrent detections of multiple distinct objects of interest in a video frame and concurrent augmentations of video content associated with the video frame based on the detections.

Device 314 may be implemented as any suitable computing device able to be operated to capture a video frame and to provide data representative of the captured video frame from device 314 to augmented reality system 302 via network 316. For example, device 314 may be a mobile phone (e.g., a smartphone), a tablet device, a wearable computing device, or the like configured to capture a video frame (e.g., with one or more cameras), to transmit the captured video frame to augmented reality system 302 by way of network 316, and to receive and display a rendered video frame with augmentation content included within the rendered video frame.

In some examples, a video frame captured by device 314 may be provided by communication facility 318 of device 314 through network 316 to communication facility 320 of augmented reality system 302. In response to the reception of the video frame at communication facility 320, a vision controller process facility 322 of augmented reality system 302 may provide the received video frame to other facilities of augmented reality system 302 in any suitable manner. For example, vision controller process facility 322 may create a workflow for a received video frame to be processed by one or more of object classification facility 304, feature-based recognition facility 306, feature matching facility 308, tracking data facility 310, and rendering facility 324 of augmentation system 312. An exemplary workflow may include, but is not limited to, a video frame being processed by object classification facility 304, then feature-based recognition facility 306, then feature matching facility 308, then tracking data facility 310, and then rendering facility 324. Other exemplary workflows may omit, add to, reorder, and/or modify any of the facilities to perform one or more operations on the video frame. In certain examples, object classification facility 304 may perform class-wide detection of objects and feature-based recognition facility 306 may perform target-specific identification, such that these two facilities may synergistically work together to increase the capacity of the augmented reality system 302 as described below.

To illustrate one example, a received video frame may be provided, e.g., by vision controller process facility 322, to object classification facility 304, which may perform one or more operations on the video frame. For example, object classification facility 304 may detect one or more objects within the video frame, identify a distinct class label of each of the one or more objects, and identify a distinct region of interest, within the video frame, of each of the one or more objects as will be described with reference to FIG. 4.

Figure 4:
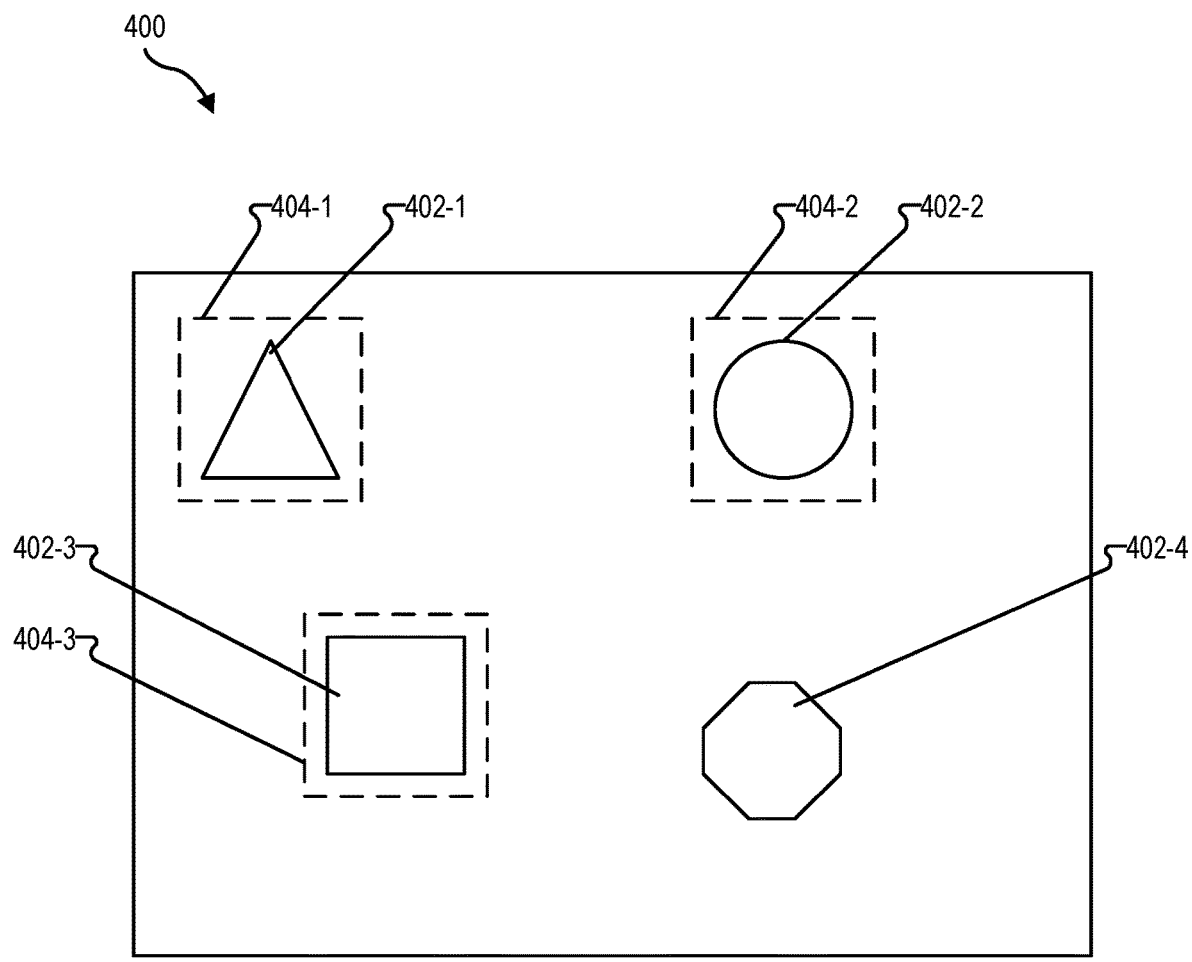
FIG. 4 shows an exemplary video frame illustrating multiple depicted objects according to principles described herein.

FIG. 4 shows an exemplary video frame 400 illustrating multiple objects 402 (e.g., objects 402-1, 402-2, 402-3, and 402-4) depicted within video frame 400. In certain examples, each object 402-1, 402-2, 402-3, and 402-4 may be a different object with distinct features.

Object classification facility 304 may, in any suitable way, detect one or more of objects 402-1, 402-2, 402-3, and 402-4, identify a distinct class label of each detected object, and identify a distinct region of interest, within video fame 400, of each detected object. For example, object classification facility 304 may detect one or more of objects 402-1, 402-2, 402-3, and 402-4 by performing one or more operations including, but not limited to, accessing the video frame 400 and executing a machine learning model, such as trained object identification model 204, to detect, within video frame 400, one or more distinct features associated with different classes of objects. In an example, object classification facility 304 may detect only those objects 402 having features that match features of one or more known object classes. In an example, a known object class is a class or group of objects having features that object classification facility 304 (e.g., trained object identification model 204) has been trained to identify. In certain examples, object classification facility 304 may pull trained object identification model 204 from another device (e.g., a cloud platform device) by way of network 316 on-demand to conserve resources utilized in system 302 to maintain and store trained object identification model 204.

When a set of features of a particular known object class is detected, object classification facility 304 may detect an object 402 (e.g., object 402-1, 402-2, or 402-3) associated with the set of features. However, if set of features within video frame 400 do not match features of any known object class, then object classification facility 304 may not detect an object 402 (e.g., object 402-4) associated with these set of features. In an example, object classification facility 304 may not identify a class label and region of interest of non-detected objects 402. For example, object classification facility 304 may detect objects 402-1, 402-2, and 402-3 that an object identification model has been trained to detect but not detect object 402-4 that the object identification model has not been trained to detect.

Based on the detection of objects 402-1, 402-2, and 402-3, object classification facility 304 may identify a distinct class label of each of the detected objects 402-1, 402-2, and 402-3 in any suitable way. In an example, object classification facility 304 may determine distinct confidence metrics (e.g., probabilities) of each object class having features in common with the features of a detected object 402. Based on the distinct confidence metrics, object classification facility 304 may identify a class label of the object class with a confidence metric that is both above a predetermined threshold level and is the highest for all object classes having features in common with the features of the detected object 402. In an additional or alternative example, object classification facility 304 may identify a distinct class label of each of the detected objects 402-1, 402-2, and 402-3 based on the number of features of the object 402 that match the predefined features of a particular object class. In certain examples, object classification facility 304 may identify a distinct class label of each detected object 402 in any other suitable way.

Object classification facility 304 may identify a distinct region of interest of each of the detected objects 402-1, 402-2, and 402-3 in any suitable way. In certain examples, object classification facility 304 may identify a region of interest of a detected object 402 by identifying a region, within video frame 400, where the set of features of that particular object are located (e.g., a region of interest 404-1 of object 402-1, a region of interest 404-2 of object 402-2, and a region of interest 404-3 of object 402-3). Regions of interest 404-1, 404-2, and 404-3 may be utilized by feature-based recognition facility 306 as will be described herein.

Referring back to FIG. 3, object classification facility 304 may provide the distinct region of interest and distinct class label of each detected object 402-1, 402-2, and 402-3 to feature-based recognition facility 306, which in turn may perform one or more operations to determine whether one or more of the detected objects 402-1, 402-2, and 402-3 are configured to trigger an augmentation of video content associated with video frame 400 (e.g., augmentation of video content in video frame 400 or any related subsequent video frame from device 314). For example, feature-based recognition facility 306 may execute one or more target classifiers to determine whether the one or more of the detected objects 402-1, 402-2, and 402-3 are configured to trigger an augmentation of video content associated with video frame 400. Each target classifier may be associated with a distinct class label.

In certain examples, based on the distinct class label of each detected object 402 (e.g., objects 402-1, 402-2, and 402-3), feature-based recognition facility 306 may select, from a plurality of target classifiers, a distinct target classifier of each detected object. A target classifier may be configured to identify and compare features within a region of interest of an object 402 to predefined features (e.g., specific features of groups of features) within a data store (e.g., one of feature data stores 114 of FIG. 1) associated with the class label of the object 402. In certain examples, predefined features may include features derived from any suitable means. For example, predefined features may be computed, by any suitable computing device (e.g., a cloud-based platform device) connected to network 316, for an object when the object is first uploaded for recognition, and these precomputed features may be stored as predefined features of the object. In an example, predefined features may also include features determined or assigned in any other suitable manner (e.g., by a user of system 302).

In an example, feature-based recognition facility 306 may include a different target classifier of each known object class (e.g., class label). Based on each of the target classifiers performing one or more localized operations on separate isolated portions of a video frame (e.g., a distinct region of interest of each object 402), the target classifiers may be configured to operate in parallel, such that determining whether one or more objects 402 depicted within a video frame are configured to trigger an augmentation of video content may have improved speed over conventional object identification technologies that include a single target classifier to search an entire video frame. Based on the multiple target classifiers operating in parallel, feature-based recognition facility 306 may have a high capacity for object detection and determination of whether the objects are configured to trigger an augmentation of video content associated with a video frame as will be described below.

In an example, feature-based recognition facility 306 may provide a selected target classifier with the region of interest, within the video frame, of a particular detected object (e.g., region of interest 404-1 of object 402-1, region of interest 404-2 of object 402-2, or region of interest 404-3 of object 402-3). In certain examples, each selected target classifier of feature-based recognition facility 306 may receive a different region of interest 404 (e.g., one target classifier receives region of interest 404-1, another target classifier receives region of interest 404-2, and another target classifier receives region of interest 404-3).

Feature-based recognition facility 306, via the target classifiers, may compare set of features of an object 402 found within the received region of interest 404 with predefined groups of features stored within a data store associated with the class label of the object 402. In an example, each predefined group of features may be precomputed for, and assigned or associated with a different target or object configured to trigger an augmentation of video content associated with video frame 400.

Feature-based recognition facility 306 may determine whether the set of features of an object 402 found within a region of interest 404 match one or more of predefined features within the data store associated with the class label of the object 402 in any suitable manner. For example, feature-based recognition facility 306 may compare the features found within a region of interest 404 with correspondence features of groups of features stored within the feature data store associated with the class label of the object 402. In an example, feature-based recognition facility 306 may determine that the features within a region of interest 404 do not match any of the correspondence features of the groups of features with an associated data store. In response, feature-based recognition facility 306 may determine that the detected object is not configured to trigger an augmentation of the video frame 400. Alternatively, if feature-based recognition facility 306 determines that the features within a region of interest 404 match with a set of correspondence features in the groups of features, feature-based recognition facility 306 may determine that the object 402 is configured trigger an augmentation of video content associated with video frame 400.

In an example, based on feature-based recognition facility 306 determining that an object 402 is configured to trigger an augmentation of video content associated with video frame 400, feature-based recognition facility 306 may determine a specific target within the data store to be a match for the detected object. For example, feature-based recognition facility 306 may determine a closest match between the features of an object 402 found within a region of interest 404 and features of the one or more targets (each target is associated with a different group of features) within the data store.

In an additional or alternative example, based on feature-based recognition facility 306 determining that an object 402 is configured to trigger an augmentation of video content associated with video frame 400, feature-based recognition facility 306 may determine a top (e.g., highest) set of possible targets within the data store to be likely matches for the detected object. For example, feature-based recognition facility 306 may determine a set of closest matches between the features of an object 402 found within a region of interest 404 and correspondence features of the closest targets (e.g., three closest targets).

Feature-based recognition facility 306 may determine whether features found in a region of interest of a video frame match correspondence features of a target stored in a data store in any suitable manner. To this end, feature-based recognition facility 306 may employ any suitable image feature-based recognition technologies. Feature-based recognition facility 306 may be configured to use any suitable comparison of features and matching criteria (e.g., feature matching thresholds) as may suit a particular implementation.

In response to a determination that a detected object 402 within a region of interest 404 of a video frame is configured to trigger an augmentation of video content associated with the video frame, feature-based recognition facility 306 may perform one or more operations to initiate augmentation of the video content associated with the video frame. For example, feature-based recognition facility 306 may provide data representative of the region of interest 404 and a determined target of the object 402 within the region of interest 404 to rendering facility 324 of augmentation system 312 for further processing as will be described below.

In certain examples, after object classification facility 304 has identified one or more regions of interest 404, object classification facility 304 may apply a mask to video frame 400 to determine a remaining portion of video frame 400 (e.g., portion of video frame 400 not included within any of region of interests 404-1, 404-2, and 404-3). Examples of applying a mask to video frame 400 and determining a remaining portion of video frame 400 will now be described with respect to FIG. 5.

Figure 5:
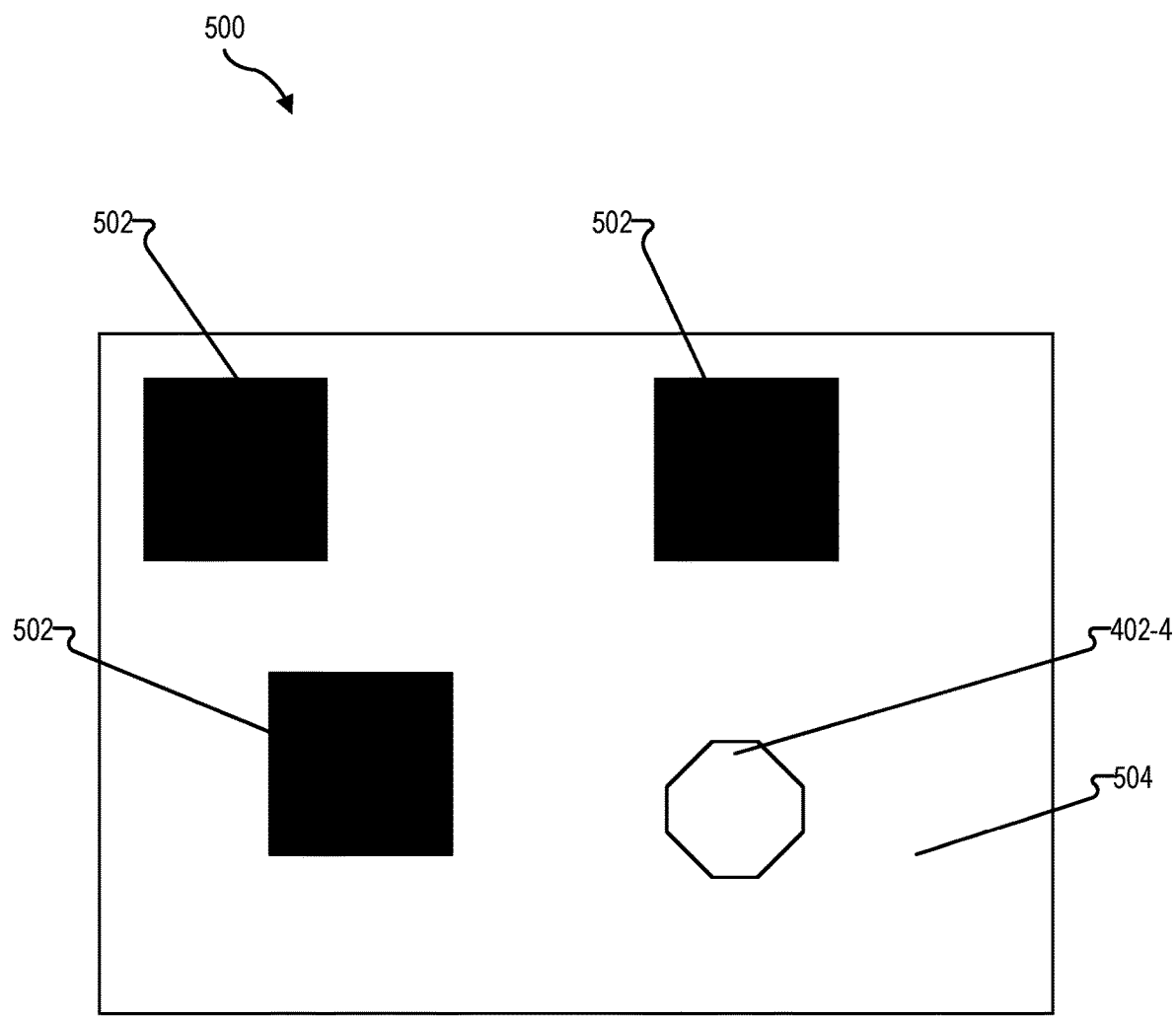
FIG. 5 shows an exemplary video frame illustrating a mask applied to the video frame according to principles described herein.

FIG. 5 shows an exemplary video frame 500 illustrating a mask 502 applied to video frame 500. Video frame 500 may represent video frame 400 of FIG. 4 after mask 502 is applied. In an example, object classification facility 304 may apply mask 502 to video frame 500 in any suitable manner. Upon mask 502 being applied to video frame 500, the distinct regions of interest of detected objects 402 (e.g., objects 402-1, 402-2, and 402-3 of FIG. 4) are masked (e.g., covered up or otherwise excluded from video frame 500 or a view of video frame 500) within the video frame 500. Application of mask 502 may result in a video frame 500 that includes a remaining portion 504 (a remaining portion of video frame 400) in which one or more undetected objects 402 (e.g., object 402-4) may be depicted.

Feature-based recognition facility 306 may perform one or more operations on the unmasked remaining portion 504 of masked video frame 500 to determine whether one or more objects 402 within the remaining portion 504 are configured to trigger an augmentation of video content. For example, feature-based recognition facility 306 may execute a miscellaneous target classifier to determine whether one or more of the objects 402 within the remaining portion 504 are configured to trigger an augmentation of video content. In an example, the miscellaneous target classifier may be configured to identify objects 402 that are not associated with a known object class of object classification facility 304, and to compare features of the objects 402 to predefined features stored in a miscellaneous data store.

In certain examples, feature-based recognition facility 306, via the miscellaneous classifier, may compare set of features of an object 402 found within the remaining portion 504 with predefined features stored within a miscellaneous data store in a similar manner as described above of detected objects. If the set of features of an object 402 found within the remaining portion 504 match features within the miscellaneous data store, feature-based recognition facility 306 may determine that the object 402 is configured to trigger an augmentation of the video frame 400.

In response to such a determination, feature-based recognition facility 306 may perform one or more operations to initiate augmentation of video content associated with video frame 400. For example, feature-based recognition facility 306 may provide a determined target of an object 402 within the remaining portion 504 to rendering facility 324 of augmentation system 312 for further processing as will be described below.

As described above, each of the target classifiers (including the miscellaneous classifier) may search for features of an object 402 within a separate isolated section (e.g., a region of interest 404 or the remaining portion 504) of a video frame, and the isolated section may be smaller than the entire video frame. Based on the target classifiers performing one or more localized operations on separate isolated portions of a video frame, the target classifiers may be configured to operate in parallel, such that determining whether one or more objects 402 depicted within a video frame are configured to trigger an augmentation of video content may have improved speed over conventional object identification technologies that include a single target classifier to search an entire video frame.

Referring again to FIG. 3, in certain examples, feature-based recognition facility 306 may provide data representative of a set of features of an object 402 (e.g., object 402-2) determined to trigger an augmentation of a video frame to feature matching facility 308, which may perform one or more operations to select a best matching target from a set of closest matching targets of the object 402 prior to a video frame being rendered with an augmentation overlay. For example, feature matching facility 308 may extract features found within a region of interest 404 of an object 402 (e.g., region of interest 404-2 of object 402-2 in FIG. 4) that was determined to trigger an augmentation of the video frame. Feature matching facility 308 may compare the extracted features of the object 402 with features stored in a reference or feature file of each of the identified possible targets.

Based on the comparison, feature matching facility 308 may select a target of an object 402 within a region of interest 404 as the correct target. In an example, feature matching facility 308 may compare the extracted features of object 402 with features stored in a reference or feature file on a target by target basis. For example, feature matching facility 308 may perform the comparison between the extracted features of object 402 and features stored for a first target in the set of targets. If the features match, then the first target is verified as the target of object 402. Otherwise, feature matching facility 308 may continue the comparison of the extracted features of object 402 with the features of the other targets in the set of targets identified by feature-based recognition facility 306 until a match is determined or all of the comparisons have been completed.

If feature matching facility 308 verifies a target in the set of targets of the object 402, the extracted features of the object 402 may be provided to tracking data facility 310. Otherwise, if feature matching facility 308 does not verify any of the targets in the set of targets of the object 402, feature matching facility 308 may identify the object 402 as a false positive for an object configured to trigger an augmentation of a video frame. Based on an identification of a false positive by feature matching facility 308, the workflow for the video frame 400 may end (if no other objects 402 were determined to trigger an augmentation of the video frame 400) such that rendering facility 324 does not render a video frame with an augmentation overlay based on the false positive.

In certain examples, a reference or feature file may be created, in any suitable way, for an object when that particular object is first uploaded to a device for identification. For example, any suitable device connected to network 316 may detect a set of features of the new object and store those features in the reference or feature file for later use by feature matching facility 308 to determine whether a false positive detection was made. Thus, object classification facility 304, feature-based recognition facility 306, and feature matching facility 308 may combine to increase the robustness and accuracy of augmented reality system 302 by providing a multi-step operation of detection, identification, and verification for determining whether an object is configured to trigger an augmentation of video content as described herein.

Feature matching facility 308 may provide tracking data facility 310 with data (e.g., data representative of extracted features of an object 402) associated with a verified object 402 that has been verified as configured to trigger augmentation of video content. Based on reception of the extracted features of an object 402 (e.g. object 402-2) configured to trigger an augmentation, tracking data facility 310 may be configured to perform one or more operations to track object 402 within one or more video frames in any suitable manner. For example, tracking data facility 310 may track, within updated video frames (e.g., video frames that are subsequent to video frame 400), the set of features of object 402 in any suitable way. Based on a determination that the features of object 402 have moved within one or more of the video frames, tracking data facility 310 may provide and/or store tracking data of the object 402. In an example, tracking data of the object 402 may include any suitable data, including, but not limited to, data indicating a current location of the features of object 402 in a video frame associated with video frame 400 and/or data indicating a change in location of the features of object 402 within the video frame associated with video frame 400. Upon the tracking data being determined, tracking data facility 310 may store the tracking data in a data store for access and use to enable augmentation content in a rendered video frame to be positioned relative to a current location of an associated object 402 configured to trigger augmentation of a video frame.

In an example, the tracking data may be determined by tracking data facility 310 and provided to object tracking facility 326 of device 314. In an example, object tracking facility 326 may utilize the tracking data to continually or continuously track object 402 within video frames subsequent to video frame 400. Thus, object tracking facility 326 may utilize the tracking data such that object 402 may be tracked and an associated augmentation may be rendered even if device 314 loses communication with system 302.

In certain examples, as stated above, rendering facility 324 may receive, from feature-based recognition facility 306, a target or a group of features associated with one or more objects 402 depicted within video frame 400 that have been determined to trigger an augmentation of a video frame (e.g., video frame 400 or a subsequent video frame received from device 314). In an example, feature-based recognition facility 306 may determine that only one of the objects 402 (e.g., object 402-2) depicted within video frame 400 is configured to trigger an augmentation of a video frame. Based on this determination, feature-based recognition facility 306 may provide the target or group of features associated with object 402-2 to rendering facility 324 so that a video frame (e.g., video frame 400 or a subsequent video frame received from device 314) may be rendered with augmentation content associated with the object 402-2.

In an example, rendering facility 324 may perform one or more operations to render a video frame associated video frame 400 or a subsequent video frame with an augmentation overlay associated with object 402-2. For example, rendering facility 324 may identify augmentation content of a target or group of features associated with object 402-2 to provide as an augmentation overlay within a rendered video frame. An example of a rendered video frame will be described with reference to FIG. 6.

Figure 6:
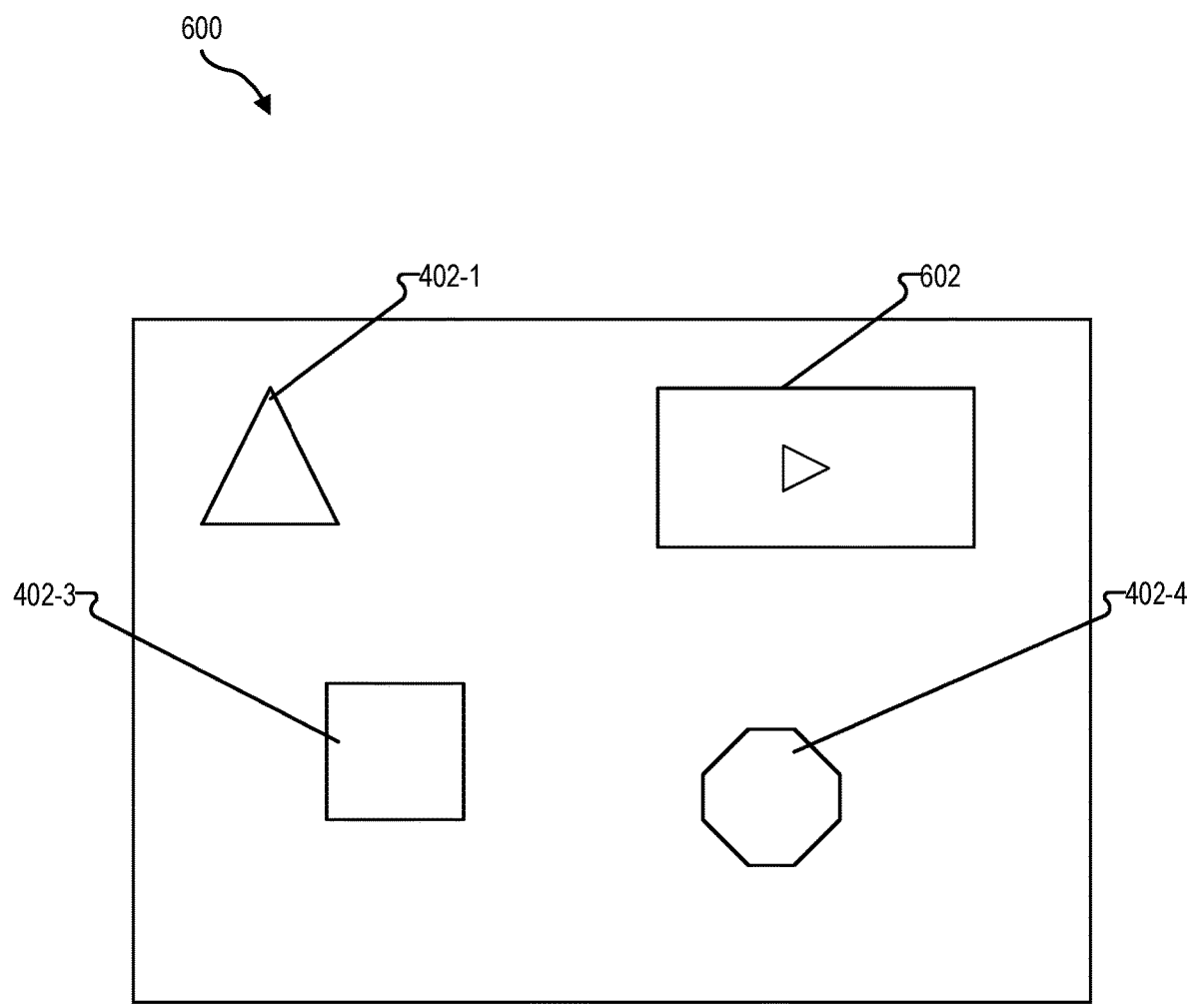
FIG. 6 shows an exemplary rendered video frame illustrating an augmentation overlay according to principles described herein.

FIG. 6 shows an exemplary rendered video frame 600 illustrating augmentation content 602 as an augmentation overlay within rendered video frame 600. Video frame 600 may represent video frame 400 or a video frame associated with video frame 400 augmented with augmentation content 602 in response to a determination that an object depicted in video frame 400 is configured to trigger augmentation. In an example, rendered video frame 600 may include augmentation content 602 and objects 402-1, 402-3, and 402-4, which were not configured to trigger an augmentation of video content. Augmentation content 602 may be any suitable content including, but not limited to, a video clip (e.g., moving picture experts group (MPEG) video clip), a three-dimensional ("3-D") animation, an image overlay (e.g., a joint photographic experts group (JPEG) image, a graphics interchange format (GIF) image, and any other suitable video or image format. In certain examples, rendering facility 324 may utilize any suitable data, such as tracking data from tracking data facility 310, to provide the augmentation content 602 at a current location of object 402-2 within rendered video frame 600 or at any other position relative to the current location of object 402-2 within rendered video frame 600.

While only a single instance of augmentation content 602 is described herein for certain examples, multiple objects 402 may trigger an augmentation of a video frame. In certain examples, if multiple objects 402 are determined to trigger an augmentation of a video frame, rendered video frame 600 may include multiple instances of augmentation content. In an example, if more than one of the multiple instances of augmentation content are videos, while each of the videos may be displayed at the same time, the audio of only one video will be provided at a time by device 314. In certain examples, the selection of the audio to be provided may be performed in any suitable manner including, but not limited to, selection by a user of device 314 and automatic selection by device 314 or augmented reality system 302.

An implementation of augmented reality system 302 at one or more network-edge devices having one or more low-latency connections to device 314 may be well-suited to provide multiple, concurrent augmentations of video captured by device 314 when the captured video includes multiple target objects configured to trigger augmentation of the captured video.

Referring again to FIG. 3, augmentation system 312 may provide rendered video frame 600 to device 314 for display to a user of device 314. Upon reception of the rendered video frame 600, an augmented reality rendering facility 320 may provide the rendered video frame 600 with augmentation content 602 as an augmentation overlay to a user of device 314.

In some alternative examples, augmentation system 312 may be configured to provide augmentation content (e.g., augmentation content 602) to device 314 for use by device 314 to render video content that is augmented with the augmentation content. For example, instead of augmentation system 312 rendering an augmented video frame and providing the augmented video frame to device 314, augmentation system 312 may identify augmentation content to be used to augment a video frame and may provide the augmentation content to device 314. Device 314 may be configured to receive and use the augmentation content to augment a video frame captured by device 314, such as by rendering and displaying an augmented video frame that includes an augmentation overlay. In certain examples, device 314 may continue to provide augmentation overlay even if device 314 loses communication with system 302. In such examples, device 314 may utilize the tracking data from tracking data facility 310 and the augmentation content from augmentation system 312 to identify objects already recognized by system 302 and to provide the augmentation content when device 314 is not in communication with system 302.

Whether augmentation system 312 provides augmentation content to device 314 or uses augmentation content to render an augmented video frame that is provided to device 314, augmentation system 312 may be configured to identify augmentation content that will be used to augment video content in any suitable way. In some examples, augmentation system 312 may identify augmentation content (e.g., augmentation content 602) of a video frame based on features associated with a detected object 402 (e.g., object 402-2) configured to trigger an augmentation of video content as described above. For instance, based on the features of a detected object, augmentation system 312 may identify specific augmentation content that has been defined as being associated with (e.g., triggered by) the features and/or a target indicated by the features.

In some examples, object classification facility 304 may not detect any objects 402 associated with a known object class within video frame even though objects 402 associated with a known object class are depicted in video frame 400. This is referred to as a false negative detection.

However, based on object classification facility 304 not detecting any objects 402 in video frame 400, object classification facility 304 may provide the entire video frame 400 to feature-based recognition facility 306, which may perform one or more operations on the entire video frame 400 to determine whether one or more objects 402 within the video frame 400 are configured to trigger an augmentation of video content in any suitable manner. For example, feature-based recognition facility 306 may iteratively process, via one or more target classifiers (e.g., one or more class-specific classifiers and/or the miscellaneous classifier), the entire video frame 400 until no more objects are detected. In an example, after each detection of an object, feature-based recognition facility 306 may provide a mask to video frame 400 to exclude regions where previous object detection were made. Thus, feature-based recognition facility 306 may identify one or more objects configured to trigger an augmentation of video content. In certain examples, providing the entire video frame 400 to feature-based recognition facility 306, as described herein, may reduce or eliminate false negatives within object identification system 100.

In certain examples, a user may upload a new object for detection by object identification system 100. In response to the upload of the new object, object identification system 100 may perform one or more operations to enable object identification system 100 to detect the new object in video frames. In an example, object identification system 100 may detect set of features of the new object, determine unique features of the new object, and store the unique features in a miscellaneous feature data store of feature data stores 114. The unique features may include features that may be identified by one of the facilities of object identification system 100 when a detection of the new object is made.

In an example, object identification system 100 may determine whether one or more of the unique features of a new the object is already assigned to another target or group of features within the miscellaneous data store. If so, object identification system 100 may adjust set of features of another target or group of features to maintain uniqueness between features of targets or groups of features.

Object identification system 100 may determine whether adjustments may be made for features stored within the miscellaneous data store of feature data stores 114 in any suitable manner. For example, object identification system 100 may compare the features of the new object with current features within the miscellaneous data store. Based on the comparison, object identification system 100 may delete or modify one or more current features within the feature data store to maintain uniqueness between the targets or groups of features.

In additional or alternative examples, the identification of a new object may be performed by any suitable device connected to network 316 in a similar manner as described above for object identification system 100. In these examples, the features of the new object may be stored in a data store of the device and pulled into a data store of object identification system 100 on demand (e.g., when utilized by object identification system 100).

Figure 7:
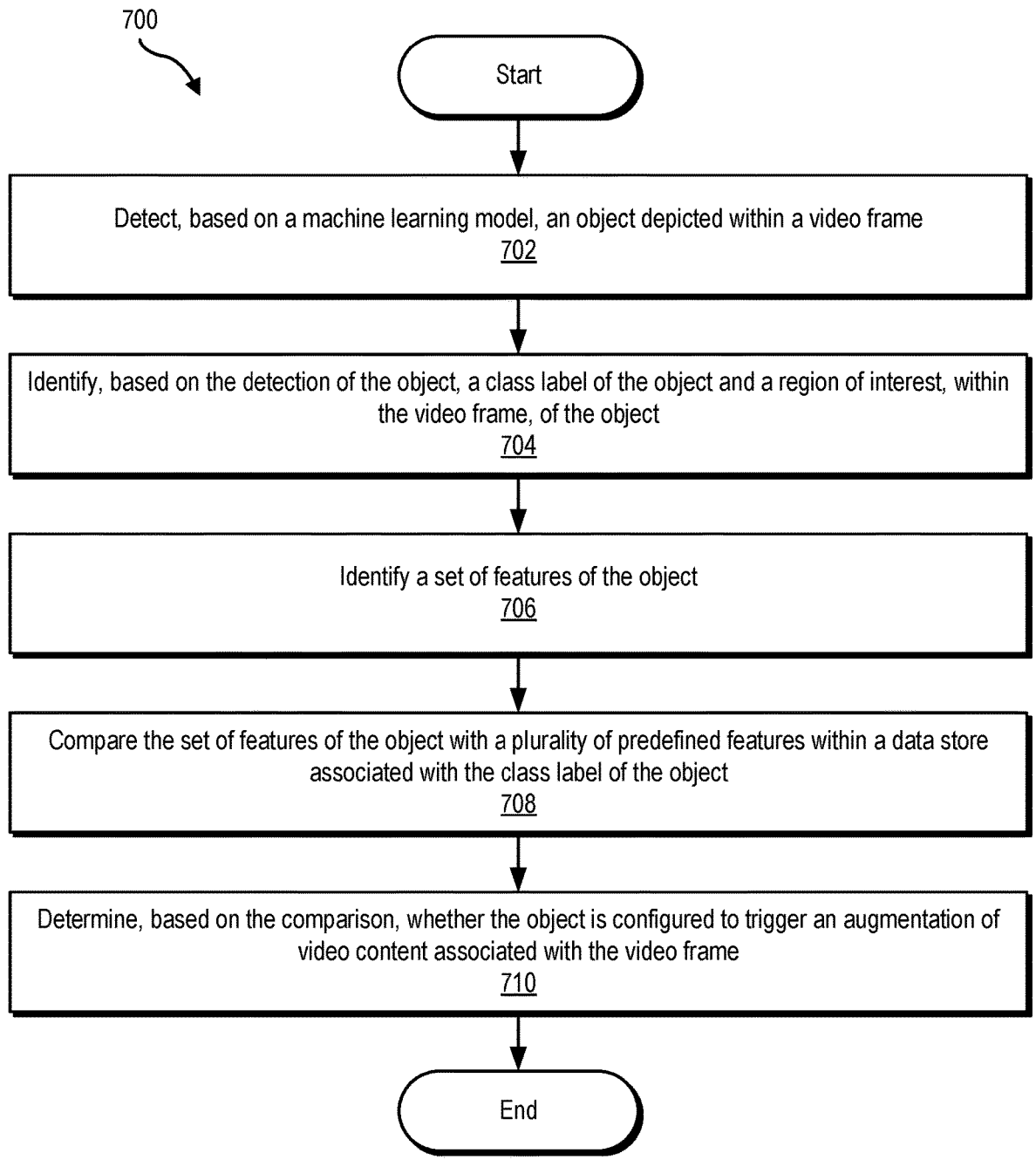
FIG. 7 illustrates an exemplary method for identifying and determining whether an object triggers an augmentation of video content according to principles described herein.

FIG. 7 illustrates an exemplary method 700 for determining whether an object within a video frame triggers an augmentation of the video frame. While FIG. 7 illustrates exemplary operations according to one embodiment, other embodiments may omit, add to, reorder, and/or modify any of the operations shown in FIG. 7. One or more of the operations shown in FIG. 7 may be performed by system 100, by any components included therein, and/or by any implementation thereof.

In operation 702, an object depicted within a video frame is detected based on a machine learning model. Operation 702 may be performed in any of the ways described herein.

In operation 704, based on the detection of the object, a class label of the object and a region of interest, within the video frame, of the object are identified. Operation 704 may be performed in any of the ways described herein.

In operation 706, a set of features of the object are identified. Operation 706 may be performed in any of the ways described herein. In one example, an object identification system may search for features of the object within the region of interest of the object.

In operation 708, the set of features of the object are compared with a plurality of defined features within a data store associated with the class label of the object. Operation 708 may be performed in any of the ways described herein.

In operation 710, based on the comparison, a determination is made whether the object is configured to trigger an augmentation of video content associated with the video frame. Operation 710 may be performed in any of the ways described herein. In one example, if the set of features of the object match features within the data store associated with the class label, an object identification system may determine that the object is configured to trigger an augmentation of the video frame. In an example, if the set of features of the object do not match features within the data store associated with the class label, an object identification system may determine that the object is not configured to trigger an augmentation of the video frame.

Figure 8:
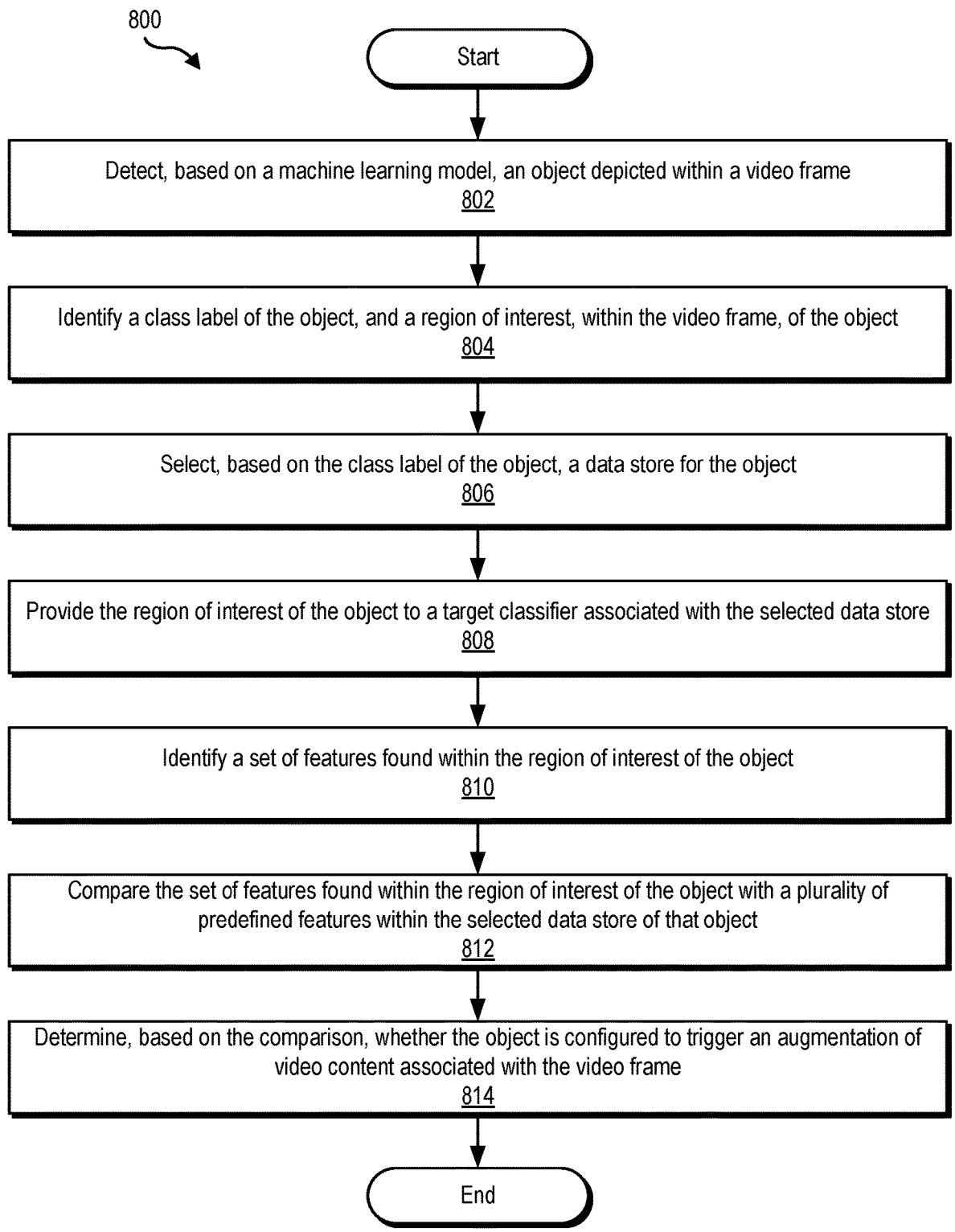
FIG. 8 illustrates another exemplary method for identifying and determining whether an object triggers an augmentation of video content according to principles described herein.

FIG. 8 illustrates another exemplary method 800 for determining whether an object within a video frame triggers an augmentation of the video frame. While FIG. 8 illustrates exemplary operations according to one embodiment, other embodiments may omit, add to, reorder, and/or modify any of the operations shown in FIG. 8. One or more of the operations shown in FIG. 8 may be performed by system 100, by any components included therein, and/or by any implementation thereof.

In operation 802, an object depicted within a video frame is detected based on a machine learning model. Operation 802 may be performed in any of the ways described herein.

In operation 804, based on the detection of the object, a class label of the object and a region of interest, within the video frame, of the object are identified. Operation 804 may be performed in any of the ways described herein.

In operation 806, a data store of the object is selected. Operation 806 may be performed in any of the ways described herein. In one example, an object identification system may select a data store from a plurality of data stores based on the class label of the object.

In operation 808, the region of interest of the object is provided to a target classifier. Operation 808 may be performed in any of the ways described herein. In one example, an object identification system may provide data representative of the region of interest to a target classifier associated with the selected data store.

In operation 810, a set of features of the object found within the region of interest of the object are identified. Operation 810 may be performed in any of the ways described herein. In one example, an object identification system may search for features only within the region of interest of the object.

In operation 812, the set of features found within the region of interest of the object are compared with a plurality of defined features within the selected data store of the object. Operation 812 may be performed in any of the ways described herein.

In operation 814, based on the comparison, a determination is made whether the object is configured to trigger an augmentation of video content associated with the video frame. Operation 814 may be performed in any of the ways described herein. In one example, if the set of features of the object match features within the selected data store, an object identification system may determine that the object is configured to trigger an augmentation of the video frame. In an example, if the set of features of the object do not match features within the selected data store, an object identification system may determine that the object is not configured to trigger an augmentation of the video frame.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 9:
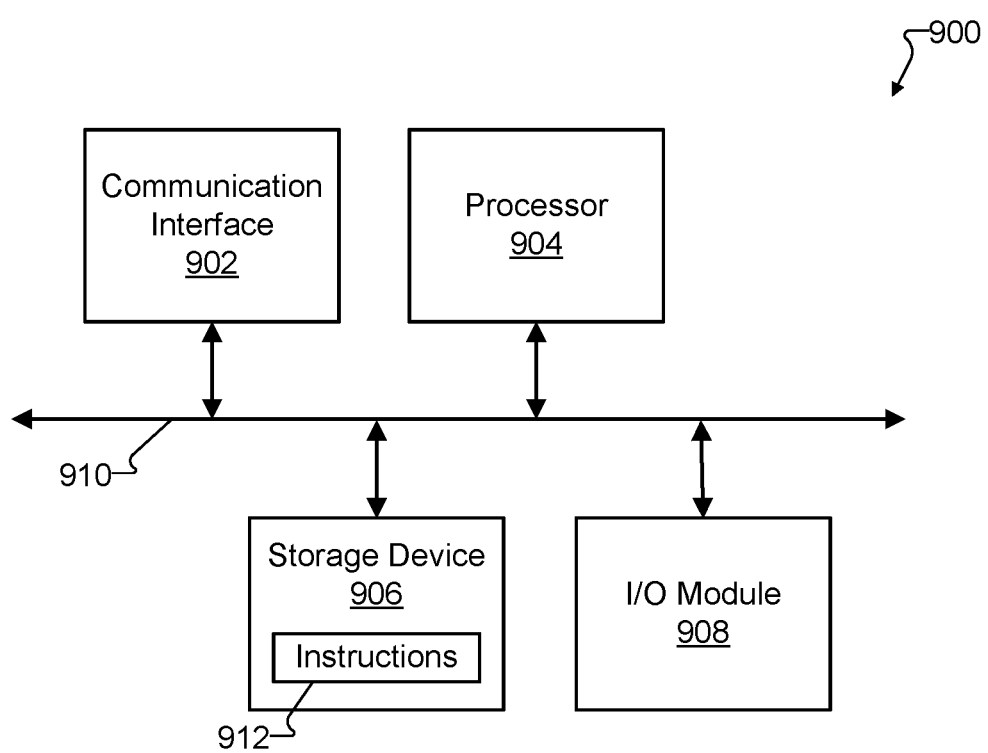
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, storage facility 102 of system 100 may be implemented by storage device 906, and facilities 104 through 108 of system 100 may be implemented by processor 904.

To the extent the aforementioned embodiments collect, store, and/or employ personal information provided by individuals, it should be understood that such information may be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by an object identification system and based on a machine learning model, an object depicted within a video frame;
   identifying, by the object identification system and based on the detecting of the object, a class label of the object and a region of interest, within the video frame, of the object;
   identifying, by the object identification system and within the region of interest of the object, a set of features of the object;
   selecting, by the object identification system based on the class label of the object and from a plurality of data stores each associated with a different class label, a data store associated with the class label of the object;
   comparing, by the object identification system, the set of features of the object with a plurality of predefined features within the data store associated with the class label of the object; and
   determining, by the object identification system and based on the comparing of the set of features of the object with the plurality of predefined features within the data store, whether the object is configured to trigger an augmentation of video content associated with the video frame.

2. The method of claim 1, further comprising rendering, by an augmentation system in response to a determination that the object is configured to trigger the augmentation of the video content associated with the video frame, an augmented video frame with augmentation content included within the augmented video frame, wherein the augmentation content is based on the set of features of the object.

3. The method of claim 1, wherein each of the plurality of data stores includes a distinct plurality of predefined features.

4. The method of claim 1, further comprising:
   detecting, by the object identification system and based on the machine learning model, a second object depicted within the video frame;
   identifying, by the object identification system and based on the detecting of the second object, a class label of the second object and a region of interest, within the video frame, of the second object;
   identifying, by the object identification system and within the region of interest of the second object, a set of features of the second object;
   comparing, by the object identification system, the set of features of the second object with a second plurality of predefined features within a second data store associated with the class label of the second object, wherein the comparing of the set of features of the second object with the second plurality of predefined features within the second data store is performed in parallel with the comparing of the set of features of the object with the plurality of predefined features within the data store; and
   determining, by the object identification system based on the comparing of the set of features of the second object with the second plurality of predefined features within the second data store, whether the second object is configured to trigger a second augmentation of second video content associated with the video frame, wherein the determining whether the second object is configured to trigger the second augmentation of the second video content associated with the video frame is performed in parallel with the determining whether the object is configured to trigger the augmentation of the video content associated with the video frame.

5. The method of claim 4, further comprising receiving, by the object identification system over a low-latency network connection, data representative of the video frame from a device that captured the video frame;
   wherein the performing of the determining whether the object is configured to trigger the augmentation of the video content associated with the video frame and the determining whether the second object is configured to trigger a second augmentation of second video content associated with the video frame in parallel facilitates concurrent low-latency network-based augmentations of the video content based on the object and the second object depicted in the video frame.

6. The method of claim 1, further comprising:
   receiving, by the object identification system, data representative of a new object to be detected by the machine learning model;
   identifying, by the object identification system in response to the receiving of the data representative of the new object, one or more features of the new object; and
   storing, by the object identification system, the one or more identified features of the new object within one of the plurality of data stores.

7. The method of claim 1, wherein the object identification system is implemented within a cloud-based network edge server having a low-latency network connection with a device that captured the video frame.

8. A non-transitory computer-readable medium having stored thereon computer-readable instructions, which instructions, when executed by a processor, perform the method of claim 1.

9. A system comprising:
   at least one memory storing instructions; and
   at least one processor communicatively coupled to the at least one memory and configured to execute the instructions to:
      detect, based on a machine learning model, an object depicted within a video frame;
      identify, based on the detection of the object, a class label of the object and a region of interest, within the video frame, of the object;
      identify, within the region of interest of the object, a set of features of the object;
      select, based on the class label of the object and from a plurality of data stores each associated with a different class label, a data store associated with the class label of the object;
      compare the set of features of the object with a plurality of predefined features within the data store associated with the class label of the object; and
      determine, based on the comparison of the set of features of the object with the plurality of predefined features within the data store, whether the object is configured to trigger an augmentation of video content associated with the video frame.

10. The system of claim 9, further comprising at least one other processor configured to render, in response to a determination that the object is configured to trigger the augmentation of the video content associated with the video frame, an augmented video frame with augmentation content included within the augmented video frame, wherein the augmentation content is based on the set of features of the object.

11. The system of claim 9, each of the plurality of data stores includes a distinct plurality of predefined features.

12. The system of claim 9, wherein the at least one processor is further configured to:
   detect, based on the machine learning model, a second object depicted within the video frame;
   identify, based on the detection of the second object, a class label of the second object and a region of interest, within the video frame, of the second object;
   identify, within the region of interest of the second object, set of features of the second object;
   compare the set of features of the second object with a second plurality of predefined features within a second data store associated with the class label of the second object, wherein the comparison of the set of features of the second object with the second plurality of predefined features within the second data store is performed in parallel with the comparison of the set of features of the object with the plurality of predefined features within the data store; and
   determine, based on the comparison of the set of features of the second object with the second plurality of predefined features within the second data store, whether the second object is configured to trigger a second augmentation of second video content associated with the video frame, wherein the determination of whether the second object is configured to trigger the second augmentation of the second video content associated with the video frame is performed in parallel with the determination of whether the object is configured to trigger the augmentation of the video content associated with the video frame.

13. The system of claim 12, wherein:
   the at least one processor is implemented within a network edge server having a low-latency network connection with a device that captured the video frame; and
   the performance of the determination of whether the object is configured to trigger the augmentation of the video content associated with the video frame and the determination of whether the second object is configured to trigger a second augmentation of second video content associated with the video frame in parallel facilitates concurrent low-latency network-based augmentations of the video content based on the object and the second object depicted in the video frame.

14. The system of claim 9, wherein the at least one processor is further configured to:
   receive data representative of a new object to be detected by the machine learning model;
   identify, in response to the reception of the data representative of the new object, one or more features of the new object; and
   store the one or more identified features of the new object within one of the plurality of data stores.

15. The system of claim 9, wherein the system is implemented within a cloud-based network edge server having a low-latency network connection with a device that captured the video frame.

16. A system comprising:
at least one physical computing device that includes at least one processor and that is configured to:
- detect, based on a machine learning model, an object depicted within a video frame,
- identify, based on the detection of the object, a class label of the object and a region of interest, within the video frame, of the object,
- identify, within the region of interest of the object, a set of features of the object,
- select, based on the class label of the object, a data store from a plurality of data stores each storing a respective plurality of predefined features,
- compare the set of features of the object with the plurality of predefined features stored within the selected data store, and
- determine, based on the comparison of the set of features of the object with the plurality of predefined features stored within the data store, whether the object is configured to trigger an augmentation of video content associated with the video frame.

17. The system of claim 16, wherein the at least one physical computing device further implements an augmentation system configured to render, in response to a determination that the object is configured to trigger the augmentation of the video content associated with the video frame, an augmented video frame with augmentation content included within the augmented video frame, wherein the augmentation content is based on the set of features of the object.

18. The system of claim 16, wherein:
the at least one physical computing device is further configured to:
- detect, based on the machine learning model, a second object depicted within the video frame;
- identify, based on the detection of the second object, a class label of the second object and a region of interest, within the video frame, of the second object;
- identify, within the region of interest of the second object, set of features of the second object;
- compare the set of features of the second object with a second plurality of predefined features within a second data store associated with the class label of the second object, wherein the comparison of the set of features of the second object with the second plurality of predefined features within the second data store is performed in parallel with the comparison of the set of features of the object with the plurality of predefined features within the data store; and
- determine, based on the comparison of the set of features of the second object with the second plurality of predefined features within the second data store, whether the second object is configured to trigger a second augmentation of second video content associated with the video frame, wherein the determination of whether the second object is configured to trigger the second augmentation of the second video content associated with the video frame is performed in parallel with the determination of whether the object is configured to trigger the augmentation of the video content associated with the video frame.

19. The system of claim 16, wherein the at least one physical computing device is further configured to:
- receive data representative of a new object to be detected by the machine learning model;
- identify, in response to the reception of the data representative of the new object, a set of features of the new object; and
- store the identified set of features of the new object within one of the plurality of data stores.

20. The system of claim 16, wherein the at least one physical computing device is implemented by at least one cloud-based network edge server having a low-latency network connection with a device that captured the video frame.

* * * * *